US00RE47694E

(19) United States
(12) Reissued Patent
Buoni et al.

(10) Patent Number: US RE47,694 E
(45) Date of Reissued Patent: Nov. 5, 2019

(54) WALL PANEL

(71) Applicant: Boral Stone Products LLC, Roswell, GA (US)

(72) Inventors: Wayne Joseph Buoni, Johns Creek, GA (US); Douglas Edward Lehman, Angwin, CA (US); Douglas M. McCaskey, Sylvania, OH (US)

(73) Assignee: Boral Stone Products LLC, Roswell, GA (US)

(21) Appl. No.: 15/423,504

(22) Filed: Feb. 2, 2017

Related U.S. Patent Documents

Reissue of:
(64) Patent No.: 9,027,302
Issued: May 12, 2015
Appl. No.: 13/569,762
Filed: Aug. 8, 2012

(51) Int. Cl.
*E04F 19/00* (2006.01)
*E04F 13/073* (2006.01)
*E04F 13/08* (2006.01)
*E04F 13/18* (2006.01)

(52) U.S. Cl.
CPC ..... *E04F 13/185* (2013.01); *E04F 13/0733* (2013.01); *E04F 13/0837* (2013.01)

(58) Field of Classification Search
CPC .... E04F 13/072; E04F 13/0733; E04F 13/185
USPC ..... 52/311.3, 312–314, 384, 506.01, 506.06, 52/535, 588.1, 554, 302.6, 536, 543, 546, 52/511, 519, 551
See application file for complete search history.

(56) References Cited

U.S. PATENT DOCUMENTS

| | | | |
|---|---|---|---|
| 448,733 | A | 3/1891 | Sagendorph |
| 897,353 | A | 9/1908 | Culley |
| 1,276,894 | A | 8/1918 | Flanders |
| 1,592,591 | A | 7/1926 | Amele |
| 1,688,405 | A | 10/1928 | Stoehr |
| 1,853,822 | A | 4/1932 | Krauss |
| 1,853,824 | A | 4/1932 | Krauss |
| 1,859,539 | A | 5/1932 | Slidell |
| 1,872,522 | A | 8/1932 | Stuckey |
| 1,976,947 | A | 10/1934 | Krauss |
| 2,006,635 | A | 7/1935 | Farr |
| 2,030,556 | A | 2/1936 | Veltung |
| 2,031,680 | A | 2/1936 | Tuthill |

(Continued)

FOREIGN PATENT DOCUMENTS

| | | |
|---|---|---|
| EP | 0182567 | 5/1986 |
| FR | 2461073 | 1/1981 |

(Continued)

OTHER PUBLICATIONS

Office Action received in related U.S. Appl. No. 14/299,250, dated Aug. 30, 2017.

(Continued)

*Primary Examiner* — Cary E Wehner
(74) *Attorney, Agent, or Firm* — Bookoff McAndrews, PLLC

(57) ABSTRACT

A universal corner panel includes a first surface comprising a first portion and a second portion. The first portion has a first surface topography with a first delta and the second portion has a second surface topography with a second delta. The first delta is substantially different than the second delta.

12 Claims, 12 Drawing Sheets

(56) References Cited

U.S. PATENT DOCUMENTS 2,182,523 A 12/1939 Markowski et al.
2,198,466 A 4/1940 Stolze
2,209,283 A 7/1940 Ronzone
2,214,387 A 9/1940 Snyder
2,300,258 A 10/1942 Kublanow
2,305,280 A * 12/1942 Strunk et al. ..... 52/276
D135,475 S 4/1943 Wright
D135,476 S 4/1943 Wright
2,317,428 A 4/1943 Anderson
2,329,610 A 9/1943 Harman
2,592,244 A 4/1952 Chamberlain
2,884,780 A 5/1959 Ramirez
2,991,592 A 7/1961 Rauen
3,004,369 A 10/1961 Findlay
3,131,514 A 5/1964 Siek
3,142,938 A 8/1964 Eberhardt
3,177,279 A 4/1965 Bilodeau
3,217,453 A * 11/1965 Medow ..... 52/314
3,232,017 A 2/1966 Prusinski et al.
3,248,834 A 5/1966 Polis
3,310,921 A 3/1967 Forcadell
3,332,187 A 7/1967 Arcari
3,335,048 A 8/1967 Morain
3,344,011 A 9/1967 Goozner
3,350,827 A 11/1967 Sugar et al.
3,478,479 A 11/1969 Papalia et al.
3,496,694 A 2/1970 Hicks et al.
3,521,418 A 7/1970 Bartoloni
3,524,790 A 8/1970 Mason
3,533,206 A 10/1970 Passeno, Jr.
3,613,326 A * 10/1971 Mollman ..... 52/314
3,618,888 A 11/1971 Wise
3,621,625 A * 11/1971 Medow ..... 52/314
3,646,715 A 3/1972 Pope
3,683,579 A 8/1972 Beardsley
3,701,228 A 10/1972 Taylor
3,740,910 A 6/1973 Taylor et al.
3,750,998 A 8/1973 Shoe et al.
3,754,365 A 8/1973 Carrick et al.
3,867,503 A 2/1975 Shoe et al.
3,868,801 A 3/1975 Weiner
3,885,008 A 5/1975 Martin
3,899,344 A 8/1975 Jakel
3,905,170 A 9/1975 Huettemann
3,908,326 A 9/1975 Francis
3,968,610 A * 7/1976 Medow ..... 52/314
4,001,361 A * 1/1977 Unruh ..... 264/51
4,011,702 A 3/1977 Matyas
4,026,083 A 5/1977 Hoyt et al.
4,034,528 A 7/1977 Sanders
4,037,377 A 7/1977 Howell et al.
4,065,902 A 1/1978 Lindal
4,191,521 A 3/1980 Muldery et al.
4,219,984 A 9/1980 De San
4,223,490 A * 9/1980 Medow ..... 52/98
4,241,554 A 12/1980 Infantino
4,266,382 A * 5/1981 Tellman ..... 52/316
4,271,111 A 6/1981 Sheber
4,299,069 A 11/1981 Neumann
4,306,395 A 12/1981 Carpenter et al.
4,349,588 A 9/1982 Schiffer
4,404,158 A 9/1983 Robinson et al.
4,407,104 A 10/1983 Francis
4,453,359 A 6/1984 Robinson et al.
4,468,903 A 9/1984 Eaton et al.
4,495,738 A 1/1985 Sheber
4,522,002 A 6/1985 Davis et al.
4,553,366 A 11/1985 Guerin
4,589,241 A 5/1986 Volpenhein
4,638,617 A 1/1987 James
4,644,719 A 2/1987 Salazar
4,655,719 A 4/1987 Sunray
4,656,722 A * 4/1987 Armstrong ..... 29/527.2
4,665,673 A 5/1987 Diana
4,669,238 A 6/1987 Kellis et al.
4,689,931 A 9/1987 Hodges et al.
4,773,201 A 9/1988 Trezza
4,858,410 A 8/1989 Goldman
4,932,182 A 6/1990 Thomasson
4,944,124 A * 7/1990 Armstrong ..... 52/169.12
4,946,632 A 8/1990 Pollina et al.
5,042,215 A 8/1991 Cremer et al.
5,052,161 A 10/1991 Whitacre
5,072,562 A 12/1991 Crick et al.
5,076,037 A 12/1991 Crick et al.
5,172,532 A 12/1992 Gibbar, Jr.
5,228,249 A 7/1993 Campbell
5,228,937 A 7/1993 Passeno
5,232,646 A 8/1993 Nasvik et al.
5,271,878 A 12/1993 Mizia et al.
5,311,714 A 5/1994 Passeno
5,347,784 A 9/1994 Crick et al.
5,373,676 A 12/1994 Francis et al.
5,379,561 A 1/1995 Saito
5,398,473 A 3/1995 Chan
5,515,659 A 5/1996 MacDonald et al.
5,537,792 A 7/1996 Moliere
5,540,023 A 7/1996 Jaenson
5,557,897 A 9/1996 Kranz et al.
5,634,305 A 6/1997 Erlanger
5,637,236 A * 6/1997 Lowe ..... 216/39
5,673,529 A 10/1997 Treister et al.
5,715,637 A 2/1998 Hesterman et al.
5,787,666 A 8/1998 Sherry
5,819,486 A 10/1998 Goodings
5,833,895 A 11/1998 Di Loreto
5,836,123 A * 11/1998 Gulino ..... 52/288.1
5,836,572 A 11/1998 Sugiyama
5,857,303 A 1/1999 Beck et al.
5,878,543 A 3/1999 Mowery
5,916,103 A 6/1999 Roberts
5,956,914 A 9/1999 Williamson
5,966,886 A 10/1999 Di Loreto
6,029,418 A 2/2000 Wright
6,050,037 A 4/2000 Gifford
6,134,855 A 10/2000 Beck
6,151,854 A 11/2000 Gutjahr
6,164,029 A 12/2000 Lee
6,237,288 B1 5/2001 Jenkins et al.
6,237,294 B1 5/2001 Rygiel
6,240,691 B1 6/2001 Holzkaemper et al.
6,244,009 B1 6/2001 Cerrato
6,253,511 B1 7/2001 Boyer
6,253,515 B1 7/2001 Kuelker
6,295,777 B1 10/2001 Hunter et al.
6,315,489 B1 11/2001 Watanabe
6,324,807 B1 12/2001 Ishiko
6,336,303 B1 1/2002 Vandeman et al.
6,355,193 B1 3/2002 Stott
6,408,585 B1 6/2002 Tajima
6,460,301 B1 10/2002 McKee et al.
6,467,229 B2 10/2002 Azar
6,516,578 B1 2/2003 Hunsaker
6,599,452 B1 * 7/2003 Ferguson ..... 264/46.4
6,609,342 B2 8/2003 Hikai
6,615,560 B2 9/2003 Ito
6,634,617 B2 10/2003 Potvin
6,701,683 B2 3/2004 Messenger et al.
6,729,090 B2 5/2004 Messenger et al.
6,792,727 B2 9/2004 Krieger
D497,013 S 10/2004 Hughes
6,802,165 B1 10/2004 Passeno
6,808,667 B2 10/2004 Nasvik et al.
6,820,383 B2 * 11/2004 Vos ..... 52/311.1
6,830,405 B2 12/2004 Watanabe
6,857,248 B2 2/2005 Ouellet et al.
6,898,908 B2 5/2005 Messenger et al.
6,904,780 B2 6/2005 Bullinger et al.
D510,146 S 9/2005 Attebery, II et al.
6,951,086 B2 10/2005 Passeno
6,955,019 B2 10/2005 Donlin et al.
6,968,659 B2 11/2005 Boyer
6,973,756 B2 12/2005 Hatzinikolas
6,990,778 B2 1/2006 Passeno

(56) References Cited

U.S. PATENT DOCUMENTS

| | | | | |
|---|---|---|---|---|
| RE39,091 | E | 5/2006 | Kuelker | |
| 7,096,629 | B1 | 8/2006 | Cox | |
| 7,240,461 | B1 | 7/2007 | Vandeman et al. | |
| 7,587,871 | B2 | 9/2009 | Perry | |
| 7,617,647 | B2 | 11/2009 | Turner et al. | |
| 7,647,738 | B2 * | 1/2010 | Nasvik | 52/389 |
| 7,735,287 | B2 | 6/2010 | Gaudreau | |
| 7,997,039 | B2 | 8/2011 | Wolf et al. | |
| 8,042,309 | B2 * | 10/2011 | Wolf et al. | 52/314 |
| 8,151,530 | B2 * | 4/2012 | Schwarz et al. | 52/314 |
| 8,201,372 | B2 | 6/2012 | Holt et al. | |
| 2003/0066259 | A1 | 4/2003 | Sudweeks | |
| 2004/0006943 | A1 * | 1/2004 | Weick | 52/315 |
| 2004/0107663 | A1 | 6/2004 | Waggoner | |
| 2005/0005556 | A1 | 1/2005 | Collier et al. | |
| 2005/0102946 | A1 | 5/2005 | Stucky et al. | |
| 2005/0188642 | A1 * | 9/2005 | Correia | 52/506.1 |
| 2005/0204666 | A1 | 9/2005 | Passeno | |
| 2005/0210811 | A1 | 9/2005 | Nasvik | |
| 2005/0229500 | A1 | 10/2005 | Howard | |
| 2005/0252144 | A1 | 11/2005 | MacDonald et al. | |
| 2005/0257475 | A1 | 11/2005 | Gong et al. | |
| 2006/0053743 | A1 | 3/2006 | Hatzinikolas | |
| 2006/0075712 | A1 | 4/2006 | Gilbert et al. | |
| 2006/0107610 | A1 | 5/2006 | Boserio | |
| 2006/0156668 | A1 | 7/2006 | Nasvik | |
| 2006/0191228 | A1 * | 8/2006 | Perry | 52/506.01 |
| 2006/0191232 | A1 | 8/2006 | Salazar et al. | |
| 2006/0260223 | A1 | 11/2006 | Wang | |
| 2006/0265988 | A1 | 11/2006 | Fujito | |
| 2007/0022687 | A1 * | 2/2007 | Correia | 52/311.1 |
| 2007/0044402 | A1 | 3/2007 | Hess | |
| 2007/0137127 | A1 | 6/2007 | Lincoln | |
| 2007/0137128 | A1 | 6/2007 | Viau et al. | |
| 2007/0144087 | A1 | 6/2007 | Heath et al. | |
| 2007/0151190 | A1 | 7/2007 | Huff et al. | |
| 2007/0175159 | A1 | 8/2007 | Miniter | |
| 2007/0209308 | A1 * | 9/2007 | Barrett | 52/506.05 |
| 2007/0227087 | A1 | 10/2007 | Nasr et al. | |
| 2008/0005994 | A1 | 1/2008 | Harney | |
| 2008/0028711 | A1 | 2/2008 | Logan et al. | |
| 2008/0110116 | A1 | 5/2008 | Brown et al. | |
| 2008/0115435 | A1 | 5/2008 | Riviere | |
| 2008/0155921 | A1 | 7/2008 | Wolf et al. | |
| 2008/0302050 | A1 | 12/2008 | Kalkanoglu | |
| 2008/0313988 | A1 | 12/2008 | MacDonald | |
| 2009/0049765 | A1 | 2/2009 | Grant | |
| 2009/0056257 | A1 * | 3/2009 | Mollinger et al. | 52/314 |
| 2009/0094914 | A1 | 4/2009 | Jambois et al. | |
| 2009/0113837 | A1 | 5/2009 | Mickelson | |
| 2009/0154676 | A1 | 6/2009 | Schwartz | |
| 2009/0193742 | A1 * | 8/2009 | Wolf et al. | 52/311.1 |
| 2009/0235600 | A1 * | 9/2009 | Logan et al. | 52/314 |
| 2009/0249719 | A1 * | 10/2009 | Broehl et al. | 52/250 |
| 2009/0304459 | A1 | 12/2009 | MacDonald et al. | |
| 2011/0175255 | A1 * | 7/2011 | Wernette et al. | 264/271.1 |
| 2011/0239578 | A1 | 10/2011 | Wolf et al. | |
| 2014/0041331 | A1 | 2/2014 | Buoni et al. | |

FOREIGN PATENT DOCUMENTS

| | | |
|---|---|---|
| FR | 2768452 | 3/1999 |
| GB | 444503 | 3/1936 |
| JP | 200226926 | 8/2000 |
| JP | 200297518 | 10/2000 |
| WO | 2006/042883 | 4/2006 |

OTHER PUBLICATIONS

Office Action dated Jun. 6, 2014 in U.S. Appl. No. 13/569,762.
Office Action dated Aug. 26, 2013 in U.S. Appl. No. 13/569,762.
Office Action dated Feb. 26, 2014 in U.S. Appl. No. 13/569,762.
Notice of Allowance dated Oct. 21, 2014 in U.S. Appl. No. 13/569,762.
Office Action dated Dec. 21, 2010 in U.S. Appl. No. 12/026,876.
Office Action dated Jun. 19, 2012 in U.S. Appl. No. 12/026,876.
Office Action dated Jan. 19, 2010 in U.S. Appl. No. 12/026,876.
Office Action dated Oct. 15, 2012 in U.S. Appl. No. 12/026,876.
Office Action dated May 25, 2011 in U.S. Appl. No. 12/026,876.
Office Action dated Jun. 16, 2010 in U.S. Appl. No. 12/026,876.
Office Action dated Jan. 19, 2017 in U.S. Appl. No. 14/299,250.
Pulp Art Surfaces catalog, published on May 27, 2011.
Written Opinion and Search Report of the International Searching Authority for PCT/US2007/025532, dated Apr. 21, 2008.
Non-Final Office Action issued in U.S. Appl. No. 14/299,250, dated Dec. 1, 2017.
Non-Final Office Action issued in U.S. Appl. No. 14/879,827, dated Jan. 26, 2018.
Pulp Art Surfaces catalog,May 27, 2011.*
Related U.S. Appl. No. 12/026,876, filed Feb. 6, 2008.

* cited by examiner

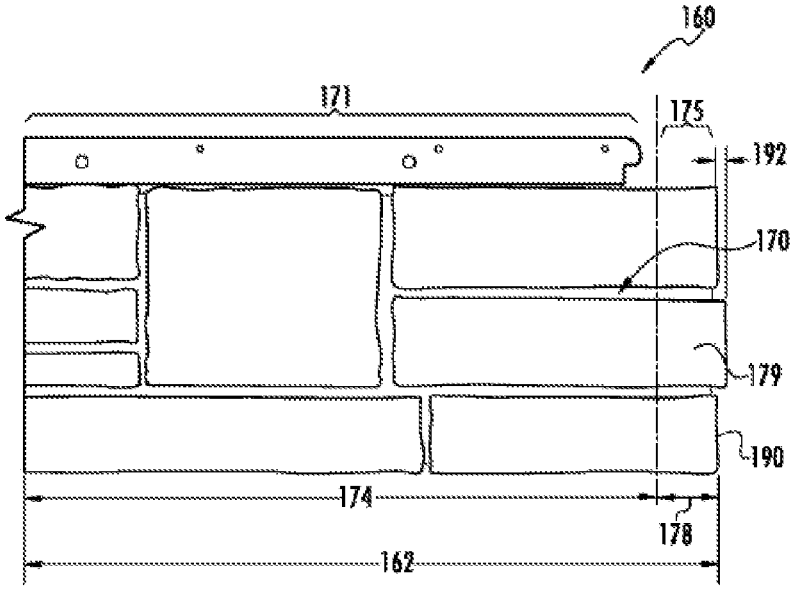
FIG. 3B (AMENDED)

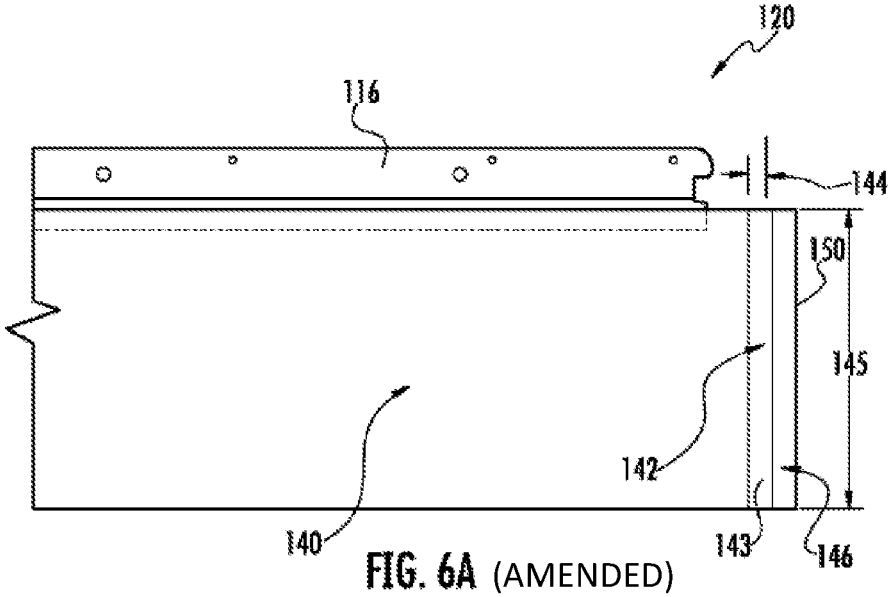
FIG. 6A (AMENDED)

WALL PANEL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

In the construction of buildings, frequently used construction products include exterior cladding materials. Exterior cladding materials may be used to cover the exterior surfaces formed from various framing structures. Over the years, exterior cladding materials have been formed as prefabricated or cast veneer wall panels, which provide a quick and efficient way to provide a masonry appearance for a building while also simplifying construction and lowering cost. Non-limiting examples of exterior cladding materials that have been formed in this manner include stone veneer, brick veneer, aluminum siding, vinyl siding, wood siding, stucco, concrete, glass, and metal.

In certain applications, the exterior building cladding materials may be applied to more than one wall of various sub-structures, thereby necessitating materials or panels that are configured to efficiently and effectively turn the corners created between those walls, whether an outside or an inside oriented corner. Historically, designers and installers have solved problems associated with turning corners either by simply abutted various standard configured cladding materials or by using L-shaped corner panels. However, adapting standard configured cladding materials for corner use oftentimes resulted in undesirable imperfections and/or irregular gaps adjacent the intersection of such materials, due largely to their not being intended for such use. Similarly, while traditional L-shaped corner panels addressed such standard panel concerns, their use was oftentimes cumbersome and inefficient, particularly as many structural corners are not precisely and repeatedly L-shaped. Of course, traditional L-shaped corner panels only proved useful for outside-oriented corners, requiring continued adaptation of standard panels for inside-oriented corners.

Still further, in certain applications, it is oftentimes desirable to apply exterior building cladding materials along one or more walls of a sub-structure and, upon encountering an outside-oriented corner, switch to an alternate material (e.g., from stone veneer to vinyl siding). In such instances, an aesthetically pleasing termination of the exterior building cladding material is desirable. Traditionally, uniquely configured end pieces have been provided and used in such scenarios, in addition to the standard panels and/or L-shaped corner panels. As a result, installation of many cladding material systems becomes not only complex and cumbersome, but inefficient and costly, due in large part to the high level of manual labor and material waste inherently involved.

Thus, a need exists for an exterior cladding material corner panel that may be interchangeably used to address an outside-oriented corner, an inside-oriented corner, and an end wall termination. A need also exists for such a universal corner panel that eliminates the undesirable imperfections and/or irregular gaps created by using traditional panels and produce a wall having an enhanced aesthetic appearance.

BRIEF SUMMARY

In one embodiment, a universal corner panel comprises a first surface comprising a first portion and a second portion, the first portion having a first surface topography with a first delta, the second portion having second surface topography with a second delta, the first delta being substantially different than the second delta.

In one embodiment, a universal corner panel comprises a first surface; a first portion located on the first surface, the first portion comprising at least one design portion defining a maximum thickness of the first portion and at least one design portion defining a minimum thickness of the first portion; and a second portion located on the first surface, the second portion comprising at least one design portion defining a maximum thickness of the second portion and at least one design portion defining a minimum thickness of the second portion, wherein a first difference between the maximum and the minimum thicknesses of the first portion is substantially greater than a second difference between the maximum and the minimum thicknesses of the second portion.

In one embodiment, a universal corner panel comprises a first surface; a central portion of the first surface, the central portion having a first surface topography; and two peripheral portions of the first surface, each of the two peripheral portions having a second surface topography, wherein the first surface topography is substantially different from the second surface topography.

Various advantages of this invention will become apparent to those skilled in the art from the following detailed description of the invention, when read in light of the accompanying drawings.

BRIEF DESCRIPTION OF THE DRAWINGS

The accompanying drawings incorporated herein and forming a part of the specification, illustrate several aspects of the present invention and together with the description serve to explain certain principles of the invention. In the drawings:

FIG. 3B is a front elevation view of a second portion 160 of the universal corner panel 100 of FIG. 2 according to various embodiments;

FIG. 6A is a rear elevation view of the first portion 120 of the universal corner panel 100 of FIG. 2 according to various embodiments;

Reference will now be made in detail to the various embodiments of the invention, examples of which are illustrated in the accompanying drawings.

DETAILED DESCRIPTION OF VARIOUS EMBODIMENTS

Figure 1:
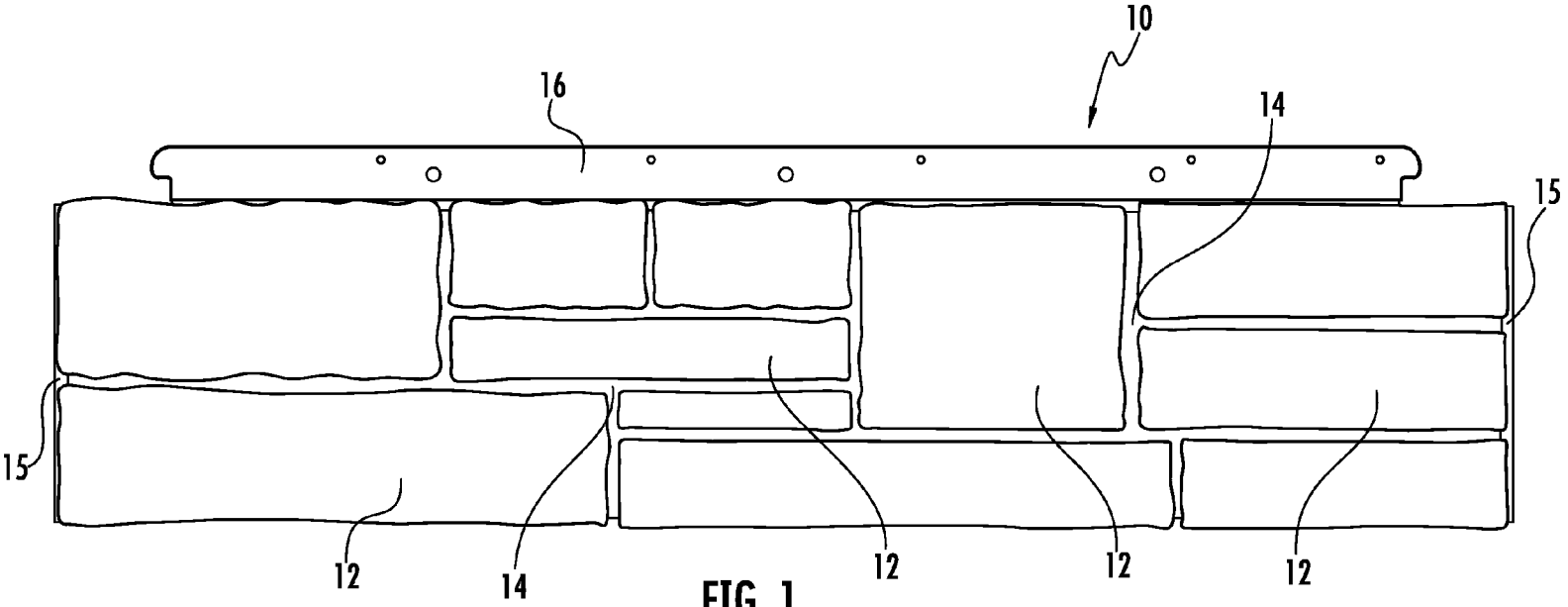
FIG. 1 (PRIOR ART)
FIG. 1 is a front elevation view of a standard flat panel 10 for use in conjunction with various embodiments of the universal corner panel disclosed herein.
Figure 2:
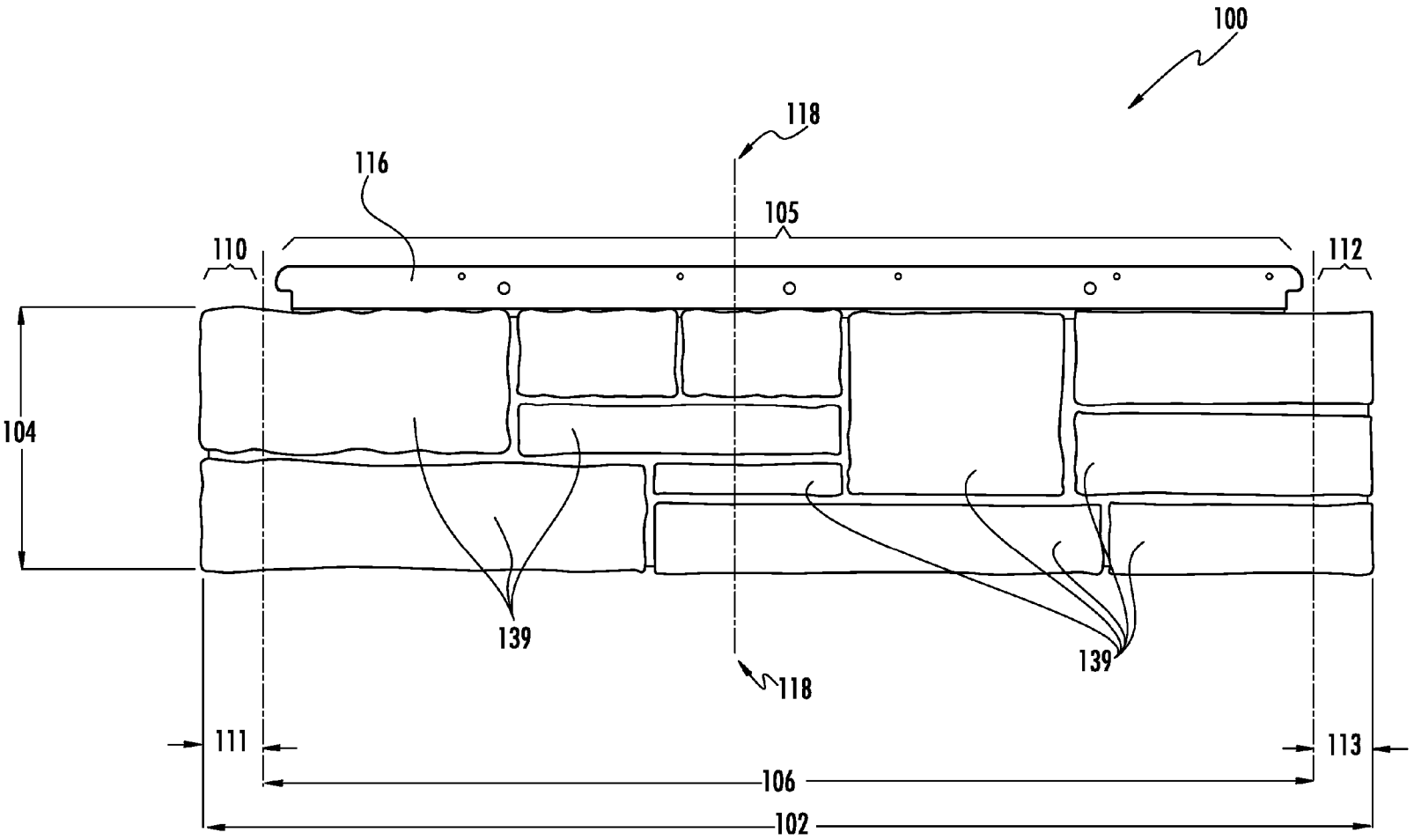
FIG. 2 is a front elevation view of a universal corner panel 100 according to various embodiments according to various embodiments.

Referring now to FIG. 2, an exemplary embodiment of a universal corner panel is shown generally as 100. Generally, the universal corner panel 100 according to various embodiments is attached to an exterior framework of a building and configured to interface with one or more standard panels (see e.g., FIG. 1). Together, the universal corner panel 100 and the one or more standard panels provide a wall panel system of the type used as a wall cladding for a building. Further applications include, but are not limited to the construction of a fireplace surround or an outdoor living component, such as a decorative wall or grill surround. Embodiments of the universal corner panel may advantageously be used for inside corners, outside corners, and an end wall termination to provide an aesthetically pleasing corner.

Reference is now made to FIG. 2 illustrating a universal corner panel 100 according to various embodiments. As may be seen from this figure, the panel 100 according to various embodiments may be made from a cast material, such as concrete, reinforced concrete, gypsum, reinforced cementitious materials, geopolymers, pozzolanic materials and/or combinations thereof. Other embodiments are envisioned where the panel is made from polymeric materials, which may or may not be filled with inorganic materials. Further, as illustrated, the universal corner panel 100 may, in any of a variety of embodiments, include a grout field, sometimes also referred to as a mortar joint, (shown but not numbered), and/or a mounting flange 116, either of which may be configured in substantially the same manner, shape, and size to the standard panel 10 of FIG. 1. It should be understood, of course, that each of these features are illustrated in an exemplary fashion and, as such, they may be alternatively configured or sized, as may be desirable for particular applications, without departing from the scope of the present invention.

The universal corner panel 100 according to various embodiments may further comprise a central portion 105, two peripheral portions 110, 112, and a plurality of design portions 139. As illustrated, the universal corner panel 100 may, in certain embodiments, be substantially rectangular in shape, although in other embodiments, the panel may be square or still otherwise shaped, as may be desirable for particular applications. Indeed, it should be understood that the length 102 and the height 104 of the panel 100 may be any of a variety of dimensions, as may be desirable for particular applications. In one embodiment, the mounting flange 116 is less than the length 102 of the panel, which advantageously allows the panel to be used to make an outside corner without the mounting flange 116 being visible.

The central portion 105 of the universal corner panel 100 according to various embodiments may have a length 106 that is to some degree less than the length 102 of the panel 100 in its entirety. Of course, it should be understood that in still other embodiments, the length 106 of the central portion 105 of the universal corner panel 100 may be any of a variety of lengths, as may be desirable for a particular application, provided such is to some degree less than the length 102 of the entire panel.

The central portion 105 of the universal corner panel 100 according to various embodiments may include a plurality of design portions 139. In certain embodiments, each of the design portions 139 may be configured to substantially resemble a plurality of natural stone elements. In other embodiments, however, the design portions 139 may not be configured so as to resemble individual stones, but rather a continuous surface of varying thicknesses. In still other embodiments, the design portions 139, whether individually or otherwise configured, may be formed so as to substantially resemble any of a variety of aesthetic masonry and/or cladding materials, as may be desirable for particular applications. However, in at least the illustrated embodiment of FIG. 2, each of the design portions 139 is configured as a separate design element, each resembling individual natural stones.

The design portions 139 of the central portion 105 according to various embodiments are configured with certain a first surface topography. The design portions 139 of the central portion 105 may, in certain embodiments, be formed with varying thicknesses (see e.g., FIGS. 3C-D), which collectively define a maximum and minimum thickness of the central portion 105. Such maximum and minimum thicknesses, in turn, define relative differences between the thicknesses of the design portions 139, which in turn define the above-described the surface topography. Such first surface topography of the design portions 139 of the central portion 105 contribute to a natural aesthetic appearance of the panel 100, namely by making it at least partially three-dimensional.

The two peripheral portions 110, 112 of the universal corner panel 100 according to various embodiments may have respective lengths 111, 113 that are not only less than the length 102 of the panel 100 in its entirety but also substantially less than the length 106 of the central portion 105. Of course, it should be understood that in still other embodiments, the lengths 111, 113 of the respective peripheral portions 110, 112 of the universal corner panel 100 may be any of a variety of lengths, as may be desirable for a particular application, provided such is to some degree less than the length 102 of the entire panel.

It should be further noted that in any of the above described embodiments, and still other embodiments, the lengths 111, 113 of the respective peripheral portions 110, 112 of the universal corner panel 100 may be greater than or equal to a corresponding thickness of the standard panel 10 of FIG. 1, which allows the standard panels 10 to be positioned relative to the corner panels 100, and in particular the respective peripheral portions 110, 112 thereof, without the standard panel abutting any portion of the central portion 105 of the corner panel.

The two peripheral portions 110, 112 of the universal corner panel 100 according to various embodiments may likewise include a plurality of design portions 139. The design portions 139 of the two peripheral portions 110, 112 according to various embodiments may be likewise configured with a certain second surface topography. The design portions 139 of the two peripheral portions 110, 112 may, in certain embodiments, be formed with varying thicknesses (see e.g., FIGS. 3C-D), which collectively define a maximum and minimum thickness of the two peripheral portions 110, 112. Such maximum and minimum thicknesses, in turn, define relative differences between the thicknesses of the design portions 139, which in turn define the second surface topography. In one embodiment, the first surface topography of the central portion 105 has a mean thickness greater than a mean thickness of the second surface topography of the two peripheral portions 110, 112, wherein the "mean thickness" value is determined by first identifying a maximum thickness and a minimum thickness in the respective portion and averaging the two thicknesses in the respective portion.

It should be understood that the second surface topography of the two peripheral portions 110, 112 differ from those of the central portion 105 in various embodiments. Generally speaking, the second surface topography of the various portions may be such that the difference between the maximum and minimum thicknesses is smaller in the two peripheral portions 110, 112 than in the central portion 105, which advantageously enables positioning of a standard panel 10 (FIG. 1) abutting the two peripheral portions 110, 112 with such abutment resulting in minimal. In other words, the three-dimensional configuration of the central portion 105, is minimal, relatively speaking, in the two peripheral portions 110, 112.

It should be further understood that the design portions 139 of the two peripheral portions 110, 112 and/or the central portion 105 may not, according to various embodiments, be respectively confined solely to one or the other of the portions. In other words, in at least certain embodiments, one or more design portions 139 may be positioned such that one segment lies in at least one of the peripheral portions 110, 112 and another segment lies in the central portion 105. At least the two left-most design portions 139 illustrated in FIG. 2 are configured and positioned in precisely this manner. In certain embodiments, such "crossing" design portions 139 may have a taper in thickness between the central portion 105 and the at least one peripheral portion 110, 112. In other embodiments, the design portions 139 may contain a notch or other cut-out feature in at least one of the peripheral portion 110, 112, which advantageously eliminates the need for an installer to chip away the design portions 139 in the peripheral portion 110, 112. In yet other embodiments, the "crossing" design portions are configured to be relatively flat, i.e., the difference between a minimum and maximum thickness of the design portion is substantially the same as the minimum and maximum thickness in the peripheral portion 110, 112.

Figure 3A:
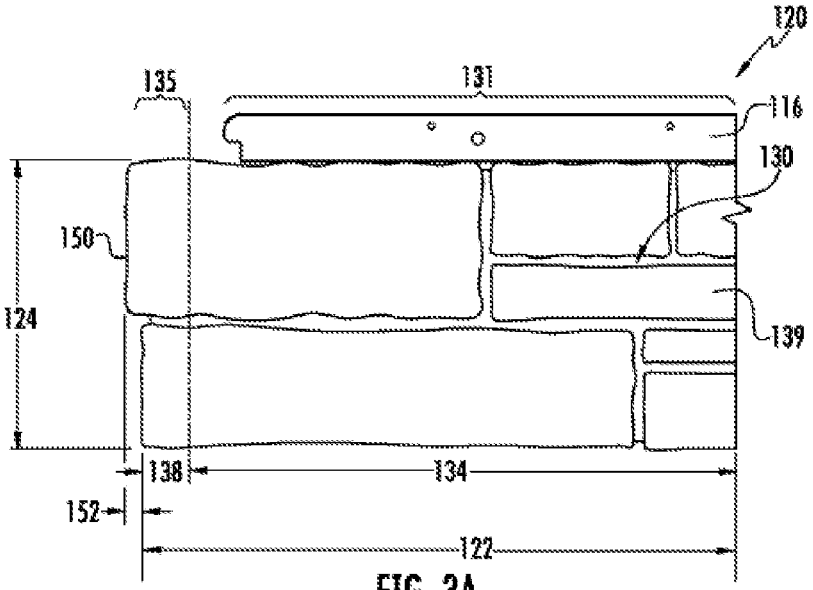
FIG. 3A is a front elevation view of a first portion 120 of the universal corner panel 100 of FIG. 2 according to various embodiments.

Reference is now made to FIGS. 3A and 3B, illustrating a first cut segment 120 and a second cut segment 160 of the panel, as separated along a cut line 118 (see FIG. 2). In these and other embodiments, it should be understood that the first cut segment 120 may have a length 122 and the second cut segment 160 may have a length 162, the sum of the two lengths 122, 162 being substantially the same as the length 102 of the panel in its entirety. Other embodiments are envisioned in which multiple cuts are made to create differing lengths for the first cut segment 120 and the second cut segment 160. In other words, at least a portion of the central portion may be removed and discarded to create differing lengths of the first cut segment 120 and the second cut segment 160.

According to various embodiments, the first cut segment 120 may also have a corresponding height 124. In certain embodiments, the height 124 is substantially the same as a height (shown but not numbered) of the standard panel 10 of FIG. 1. In this manner, the first cut segment 120 and corresponding standard panels 10 may be positioned relative to one another so as to form successively stacked "courses" or rows of panels about either inside-oriented or outside-oriented corners of a building structure 200 (see e.g., at least FIGS. 4, 7, and 10).

The first cut segment 120 of the universal corner panel 100 may, according to various embodiments, comprise a first surface 130 having a first portion 131, a second portion 135, and a plurality of design elements 139. In these and other embodiments, it should be understood that the first portion 131 may have a length 134 and the second portion 135 may have a length 138, the sum of the two lengths 134, 138 being substantially the same as the length 122 of the first cut segment 120 in its entirety.

It should be understood that the first portion 131 of the first cut segment 120 comprises a plurality of design portions or elements 139. On the first portion 131, according to various embodiments, the design portions 139 may be configured to have certain surface topography that create a natural aesthetic appearance, amongst other things. The surface topography of the first portion 131 are defined in these and other embodiments by a maximum thickness 132a of the design portions 139 and a minimum thickness 132b of the design portions, as may be best understood from FIG. 3C. In certain embodiments, a particular individual design portion/element 139 may define the maximum thickness 132a, while in other embodiments, namely those in which the design portions may not resemble individual elements, a thickest portion across the first portion 131 may define the maximum thickness. Analogous characteristics exist according to various embodiments for defining the minimum thickness 132b.

Figure 3C:
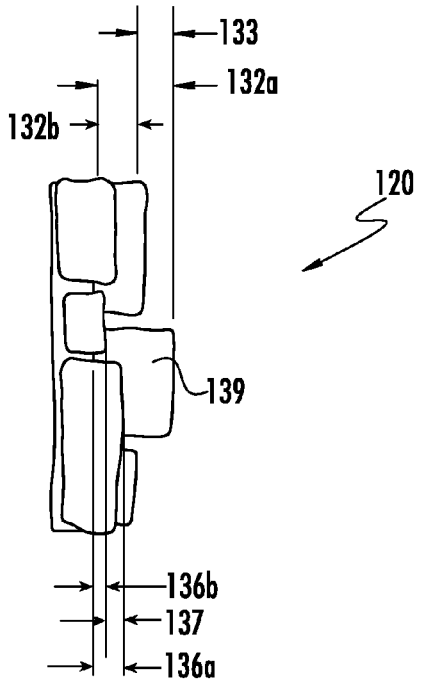
FIG. 3C is a side elevation view of a side edge of a universal corner panel 100 analogous to that illustrated in FIG. 3A according to various embodiments.

Examining FIG. 3C further, according to various embodiments it should be understood that the relative thicknesses 132a, 132b of the design portions in the first portion 131 may define a difference or delta 133 there-between. In certain embodiments, it is this delta 133, as the greater the delta, the more three-dimensional and thus "decorative" the first surface 130 of the universal corner panel 100 becomes, while the lesser the delta, the less three-dimensional and more "flat" the first surface 130 becomes. In this manner, the first portion 131 will generally be configured according to various embodiments described herein with a decorative, "greater" three-dimensional structure than the second portion 135. According to various embodiments, as may be understood from FIG. 3C, the maximum thickness 132a is generally less than or equal to the length 138 of the second portion 135.

With reference now to FIG. 3A and referring specifically to the length 138 of the second portion 135 of the first cut segment 120, it should be understood that the length 138 may be any of a variety of lengths, provided such is greater than or equal to a thickness of the standard panel 10, which may be abutted adjacently thereto. It should also be understood that the length 138 of the second portion 135 corresponds approximately to the lengths 111, 113 of at least one of the two peripheral portions 110, 112. According to various embodiments, the length 134 of the first portion 131 and the length 138 of the second portion 135 are not substantially equal relative to one another.

Referring still to FIG. 3A, it should be understood that the second portion 135 of the first cut segment 120 comprises a plurality of design portions or elements 139. On the second portion 135, according to various embodiments, the design portions 139 may be configured to have certain surface topography that not only create an aesthetic decorative appearance but also minimize gaps there-between when mounted in a corner (see e.g., FIG. 10). The surface topography of the second portion 135 are defined in these and other embodiments by a maximum thickness 136a of the design portions 139 and a minimum thickness 136b of the design portions, as may be best understood from FIG. 3C. In certain embodiments, a particular individual design portion/element 139 may define the maximum thickness 136a, while in other embodiments, namely those in which the design portions may not resemble individual elements, a thickest portion across the second portion 135 may define the maximum thickness. Analogous characteristics exist according to various embodiments for defining the minimum thickness 136b.

With reference now to at least FIGS. 3A and 3C, it should be understood that according to various embodiments, the design portions/elements 139, may be configured to extend not only across substantially all or at least a portion of the first surface 130 of the first cut segment 120, but also onto a side edge 150 of the first cut segment 120 that is substantially perpendicularly oriented relative to the first surface. In these and other embodiments, such facilitates use of the first cut segment 120 to end a wall surface without turning a corner, as illustrated in at least FIGS. 9 and 10.

Referring further to such figures, further in conjunction with FIG. 3A, it may be seen that, according to various embodiments, the design portions/elements 139 on the side edge 150 may comprise a certain surface topography, much like those located on the first surface 130. Additionally, in one embodiment, side edge 150 is free of any cut-outs or visible channels, which advantageously forms an aesthetically pleasing outside corner. Indeed, in certain embodiments, a difference in thickness between at least two design portions/elements 139 located on the side edge 150 may similarly define a delta 152, analogous to the deltas 133, 137. In this manner, the side edge 150, which may function as an end wall face (see again FIG. 9) may, in certain embodiments, be configured with "decorative" surface topography as were the first and second portions 131, 135. In at least the illustrated embodiment, the delta 152 may be dimensioned substantially the same as the delta 133; however, it should be understood that in other embodiments, the delta 152 may be dimensioned substantially the same as the delta 137 of the second portion 135. In still other embodiments, the delta 152 may be still otherwise configured and dimensioned, substantially different from both of the deltas 133, 137, as may be desirable for particular applications.

With reference now to FIG. 3B alone, the second cut segment 160 of the universal corner panel 100 may, according to various embodiments, comprise a first surface 170 having a first portion 171, a second portion 175, and a plurality of design portions/elements 179, the latter of which are substantially the same as the design portions/elements 139. In these and other embodiments, it should be understood that the first portion 171 may have a length 174 and the second portion 175 may have a length 178, the sum of the two lengths 174, 178 being substantially the same as the length 162 of the second cut segment 160 in its entirety.

Referring still to FIG. 3B, it should be understood that the first portion 171 of the second cut segment 160 comprises a plurality of design portions or elements 179. On the first portion 171, according to various embodiments, the design portions 179 may be configured to have certain surface topography that create a natural aesthetic appearance, amongst other things. The surface topography of the first portion 171 are defined in these and other embodiments by a maximum thickness 172a of the design portions 179 and a minimum thickness 172b of the design portions, as may be best understood from FIG. 3D. In certain embodiments, a particular individual design portion/element 179 may define the maximum thickness 172a, while in other embodiments, namely those in which the design portions may not resemble individual elements, a thickest portion across the first portion 171 may define the maximum thickness. Analogous characteristics exist according to various embodiments for defining the minimum thickness 172b.

Figure 3D:
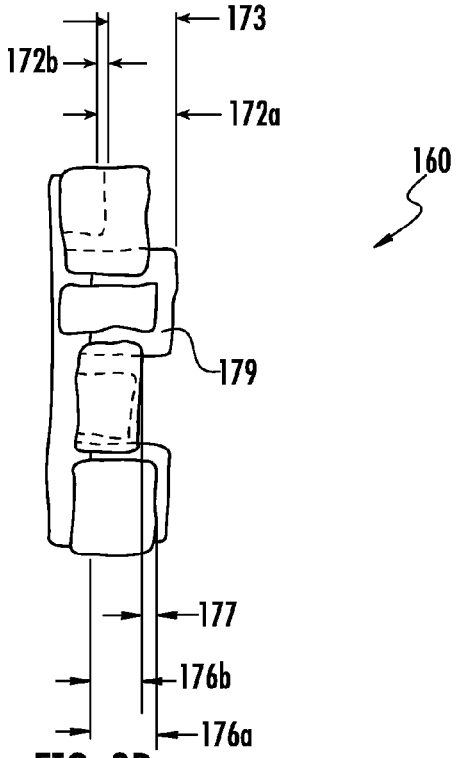
FIG. 3D is a side elevation view of a side edge of a universal corner panel 100 analogous to that illustrated in FIG. 3A according to various embodiments.

Examining FIG. 3D further, according to various embodiments it should be understood that the relative thicknesses 172a, 172b of the design portions in the first portion 171 may define a difference or delta 173 there-between. In certain embodiments, it is this delta 173 that defines the surface topography, as the greater the delta, the more three-dimensional and thus "decorative" the first surface 170 of the second cut segment 160 of the universal corner panel 100 becomes, while the lesser the delta, the less three-dimensional and more "abutment-prone" the first surface becomes. In this manner, with regard to relative dimensions of the design portions 179, the first portion 171 will generally be configured according to various embodiments described herein with a decorative, "greater" three-dimensional structure than the second portion 175.

Remaining with FIG. 3D, it may be seen that the thicknesses 172a, 172b of the first portion 171 of the second cut segment 160 further define a difference or delta 173 therebetween. Still further, it should be understood from viewing FIG. 3B in conjunction with FIG. 3D that one or more design portions/elements 179 may overlap across the first and second portions 171, 175, in which case the segment of the "crossing" elements that lie within the first portion 171 will be configured with surface topography (e.g., deltas 173), while the segment of the "crossing" elements that lie within the second portion 175 will be configured with differing surface topography (e.g., deltas 177).

It is also worth mentioning that according to various embodiments, as may be appreciated by viewing FIGS. 3A-D in conjunction with one another, the respective features of the second cut segment 160, including but not limited to the length 178 of the second portion 175, the delta 173 of the first portion 171, the delta 177 of the second portion, the first surface 170, and/or any combination of these or still other features may be configured such that they are substantially the same in shape, size, relative characteristics, and the like as the length 138 of the second portion 135, the delta 133 of the first portion 131, the delta 137 of the second portion, the first surface 130, and/or any combination of these or still other features of the first cut segment 120 illustrated in FIGS. 3A and 3C. Of course, it should be understood that in other embodiments, one or more of the above-referenced features or still other features may be configured substantially differently in the second cut segment 160 as compared to the first cut segment 120, as may be desirable for particular applications.

Still further with reference to FIG. 3B, according to various embodiments, the length 174 of the first portion 171 and the length 178 of the second portion 175 are not substantially equal relative to one another. It should be understood that the second portion 175 of the second cut segment 160 comprises a plurality of design portions or elements 179. On the second portion 175, according to various embodiments, the design portions 179 may be configured to have certain surface topography that not only create an aesthetic decorative appearance but also minimize gaps there-between when mounted in a corner (see e.g., FIG. 10). The surface topography of the second portion 175 are defined in these and other embodiments by a maximum thickness 176a of the design portions 179 and a minimum thickness 176b of the design portions, as may be best understood from FIG. 3D. In certain embodiments, a particular individual design portion/element 179 may define the maximum thickness 176a, while in other embodiments, namely those in which the design portions may not resemble individual elements, a thickest portion across the second portion 175 may define the maximum thickness. Analogous characteristics exist according to various embodiments for defining the minimum thickness 176b.

Examining FIG. 3D further, according to various embodiments it should be understood that the relative thicknesses 176a, 176b of the design portions in the second portion 175 may define a difference or delta 177 there-between. In certain embodiments, it is this delta 177 that substantially defines the surface topography, as the greater the delta, the more three-dimensional and thus "decorative" the first surface 170 of the universal corner panel 100 becomes, while the lesser the delta, the less three-dimensional and more "abutment-prone" the first surface becomes. In this manner, the second portion 175 will generally be configured according to various embodiments described herein with a non-decorative, "lesser" three-dimensional structure than the first portion 171.

Still further it should be understood from viewing FIG. 3B in conjunction with FIG. 3D that one or more design portions/elements 179 may overlap across the first and second portions 171, 175, in which case the segment of the "crossing" elements that lie within the second portion 175 will be configured with surface topography (e.g., deltas 177) that are minimal compared to those located on the first portion. In this manner, the surface topography of the second portion 175 facilitate use of the universal corner panel 100 in inside-oriented corners, as illustrated in at least FIGS. 4, 10, and 11A-B. Indeed, as may be seen from at least FIGS. 11A-B in particular, the surface topography of the second portion 175 of the universal corner panel 100 results in a much more aesthetically pleasing installation as compared to that of the standard panel 10 that creates unsightly gaps (see FIG. 11A) between adjacently positioned panels 10.

Referring now to FIGS. 3C-D, it should be understood that regardless of the various deltas 133, 137, 173, 177, the relative maximum thicknesses 132a, 136a, 172a, 176a and corresponding minimum thicknesses 132b, 136b, 172b, 176b may be configured in any of a variety of fashions. However, in certain embodiments, the maximum thickness of the segment (e.g., either 120 or 160) may occur in the first portion (e.g., "decorative" portion) thereof, while in other embodiments the maximum thickness may occur in the second portion (e.g., the "non-decorative" or "abutment" portion), depending in what may be desirable for particular applications. Across these and still other embodiments, however, it is the respective deltas 133, 137. 173, 177 that define the "decorative" versus "non-decorative" surface topography, meaning that the direction of taper between the respective first and second portions may, in at least certain embodiments, be immaterial. As non-limiting examples, in at least one embodiment, the maximum thickness may occur in the first portion, with an overall thickness taper downward to a lesser thickness in the second portion, while in another embodiment, the maximum thickness may occur in the second portion, with an overall thickness taper downward toward the first portion. The respective deltas in the second portions (e.g., 137, 177) will generally always be less than the respective deltas in the first portions (e.g., 133, 173).

With reference now to at least FIGS. 3B and 3D, it should be understood that according to various embodiments, the design portions/elements 179 may be configured to extend not only across substantially all or at least a portion of the first surface 170 of the second cut segment 160, but also onto a side edge 190 of the second cut segment 160 that is substantially perpendicularly oriented relative to the first surface. In these and other embodiments, such facilitates use of the second cut segment 160 (much like the first cut segment 120) to end a wall surface without turning a corner, as illustrated in at least FIGS. 9 and 10.

Referring further to such figures, further in conjunction with FIG. 3B, it may be seen that, according to various embodiments, the design portions/elements 179 on the side edge 190 may comprise surface topography, much like those located on the first surface 170. Indeed, in certain embodiments, a difference in thickness between at least two design portions/elements 179 located on the side edge 190 may similarly define a delta 192, analogous to the deltas 173, 177. In this manner, the side edge 190, which may function as an end wall face (see again FIG. 9) may, in certain embodiments, be configured with "decorative" surface topography, as were the first and second portions 171, 175. In at least the illustrated embodiment, the delta 192 may be dimensioned substantially the same as the delta 173; however, it should be understood that in other embodiments, the delta 192 may be dimensioned substantially the same as the delta 177 of the second portion 175. In still other embodiments, the delta 192 may be still otherwise configured and dimensioned, substantially different from both of the deltas 173, 177, as may be desirable for particular applications.

It should be further understood that, according to various embodiments, the side edge 190 of the second cut segment 160 may be configured substantially the same in shape, size, or otherwise as the side edge 150 of the first cut segment 120. Similarly, in these and other embodiments, the delta 192 may be configured substantially the same as the delta 152 of the side edge 150 of the first cut segment 120. However, in still other embodiments, the side edges 150, 190 and the deltas 152, 192 may be entirely or at least in part substantially differently configured relative to one another, as may be desirable for particular applications.

With reference now to at least FIGS. 5-8, it should be understood that the first cut segment 120 of the universal corner panel 100 may, according to various embodiments, further comprise a second surface 140 substantially opposite to the first surface 130. In certain embodiments, the second surface 140 may include at least a channel 142 and an intermediate portion 146, the intermediate portion 146 being positioned substantially between the channel 142 and the side edge 150 of the first cut segment 120.

As may be seen from FIG. 6A, the channel 142 may according to various embodiments extend substantially along the entirety of the height 104 (see FIG. 2) of the corner panel 100. In certain embodiments, however, it should be understood [that] that a height [185] *145* of the channel may be less than the height 104 of the panel, provided such is nevertheless configured to substantially receive and interface with the tongue 15 (see FIG. 1) of an adjacently positioned standard panel 10 (see FIG. 1).

As may be seen remaining with FIG. 6A with reference to FIG. 1, the depth 143 may be any of a variety of dimensions, provided such substantially corresponds to the dimensions (e.g., a depth) of the tongue 15 of a corresponding standard panel 10 (see FIG. 2) such that the tongue 15 may be substantially fully received within the depth of the channel 142. While not necessarily the case in all embodiments, for at least certain embodiments, the respective depths of the channel and tongue may be configured such that the former is at least a minimal degree larger than the former, so as to provide at least some clearance between the two for purposes of installation.

In still other embodiments, the width 144 may be any of a variety of dimensions, provided such substantially corresponds to the dimensions (e.g., a width) of the tongue 15 (FIG. 1) of a corresponding standard panel 10 (FIG. 1) such that the tongue 15 (FIG. 1) may be substantially received within the depth of the channel 142. While not necessarily the case in all embodiments, for at least certain embodiments, the respective widths of the channel and tongue may be configured such that the former is at least a minimal degree larger than the former, so as to provide at least some clearance between the two for purposes of installation.

Remaining with FIG. 6A, it should be further understood that in various embodiments, the channel 142 may further define an intermediate portion 146 on the second surface 140 of the universal corner panel 100. It should be noted though, that in at least certain embodiments, the surface of the intermediate portion 146 may be configured such that it is substantially smooth relative to the remainder of the second surface 140. Such may facilitate installation by providing a substantially planar surface, which minimizes gaps between successive panels.

With reference now to at least FIGS. 5-8, it should be understood that the second cut segment 160 of the universal corner panel 100 may, according to various embodiments, further comprise a second surface 180 substantially opposite to the first surface 170. In certain embodiments, the second surface 180 may include at least a channel 182 and an intermediate portion 186, the intermediate portion 186 being positioned substantially between the channel 182 and the side edge 190 of the second cut segment 160.

Figure 6B:
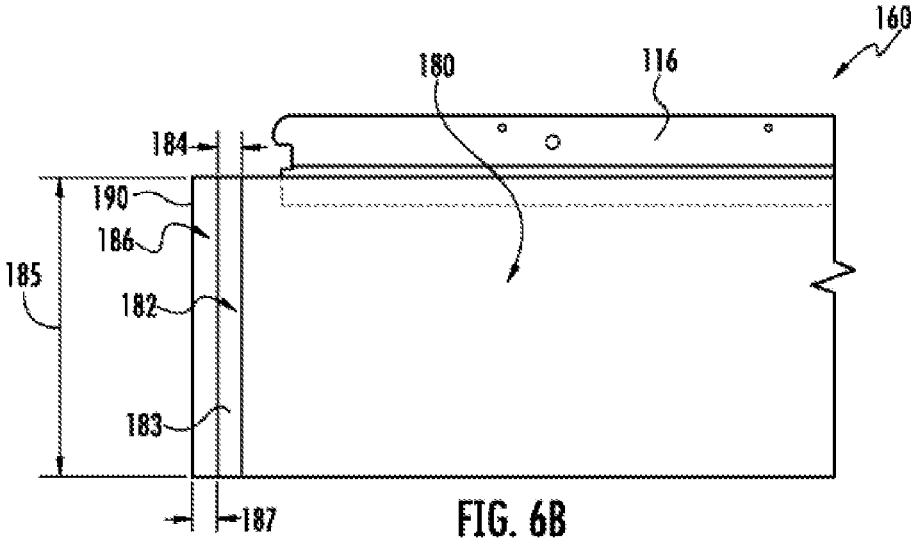
FIG. 6B is a rear elevation view of the second portion 130 of the universal corner panel 100 of FIG. 2 according to various embodiments.

As may be seen from FIG. 6B, the channel 182 may according to various embodiments extend substantially along the entirety of the height 104 (see FIG. 2) of the corner panel 100. In certain embodiments, however, it should be understood that a height 185 of the channel may be less than the height 104 of the panel, provided such is nevertheless configured to substantially receive and interface with the tongue 15 (see FIG. 1) of an adjacently positioned standard panel 10 (see FIG. 1).

As may be seen remaining with FIG. 6B, the channel 182 may according to various embodiments have a depth 183 substantially corresponding to the dimensions (e.g., a depth) of the tongue 15 (see FIG. 1) of a corresponding standard panel 10 (see FIG. 1) such that the tongue 15 (See FIG. 1) may be substantially fully received within the depth of the channel 182. While not necessarily the case in all embodiments, for at least certain embodiments, the respective depths of the channel and tongue may be configured such that the former is at least a minimal degree larger than the former, so as to provide at least some clearance between the two for purposes of installation.

According to various embodiments, the channel 182 of FIG. 6B may also have a width 184, which may be any of a variety of dimensions, provided such substantially corresponds to the dimensions (e.g., a width) of the tongue 15 (see FIG. 1) of a corresponding standard panel 10 (see FIG. 1) such that the tongue 15 (see FIG. 1) may be substantially received within the depth of the channel 182. While not necessarily the case in all embodiments, for at least certain embodiments, the respective widths of the channel and tongue may be configured such that the former is at least a minimal degree larger than the former, so as to provide at least some clearance between the two for purposes of installation.

Remaining with FIG. 6B, it should be further understood that in various embodiments, the channel 182 may further define an intermediate portion 186 on the second surface 180 of the universal corner panel 100. Of course, it should be understood that any of a variety of widths 187 may be incorporated, as may be desirable for particular applications. It should be noted though, that in at least certain embodiments, the surface of the intermediate portion 186 may be configured such that it is substantially smooth relative to the remainder of the second surface 180. Such may facilitate installation by providing a substantially planar surface, which minimizes gaps between successive panels.

According to various embodiments, the universal corner panel 100 described herein may be formed in any of a variety of ways, as commonly known and understood in the art. In certain embodiments, the panel 100 may be manufactured by an open face molding process. To practice such a process, an initial layer of material is first applied to an open face mold having cavities therein with shapes simulating exterior cladding materials (e.g., stone, brick, or the like). Next, a layer of reinforcing material may optionally be applied over the initial layer. In certain embodiments, the process may involve overlaying a mold insert configured to form the channels 142, 182, as may be desirable for particular applications. In at least one of such embodiments, the mold insert may be configured so as to not only form the channels 142, 182, but also to form the substantially smooth surface area of the intermediate portions 146, 186 of the second surfaces 140, 180.

In various embodiments, the molded material is allowed to cure and set before being removed from the mold. Upon removal, however, according to certain embodiments, the universal corner panel 100 comprises an ornamental facing layer formed from the cast molded material, such that the facing layer resembles a desirable exterior cladding material (e.g., stone, brick, or the like).

Of course, it should be understood that any of a variety of processes may be used to form the universal corner panel 100 depending on the martial employed to make the universal corner panel 100. Further processes may, in other embodiments, include compression or injection molding processes, blow mold or extrusion processes, and the like.

In one embodiment, the universal panel 100 is installed in combination with the standard panel 10 to form a wall system. The standard panel 10 may, in certain embodiments be generally described as comprising a precast body including at least one decorative design element 12. For purposes of disclosure, the terminology "standard panel" is to be given the broadest possible interpretation and covers any type of panel that is not an insert panel. In at least the illustrated embodiment of FIG. 1 each design element 12 comprises a single, variable-sized textured stone and the standard panel 10 comprises eleven stone-shaped design elements 12 positioned across two, three, and/or four rows, depending on the respective sizes of the elements 12. The standard panel 10 may also, in certain embodiments, also include a grout field 14 for receiving and holding grout that outlines the respective design elements 12 so as to provide a desired masonry appearance. In various embodiments, the standard panel 10 may further include a tongue 15 configured to substantially interlock with adjacently positioned panels, as will be described in further detail below. In certain embodiments, the tongue 15 may be selectively removable, whether detachably so or by force applied thereto, again as will be described in further detail below. The standard panel 10 according to various embodiments may also include a mounting flange 16.

In various applications, the veneer wall panel systems described herein may be installed via any of a number of methods, including the non-limiting example of the method described in further detail in U.S. Patent Application Pub. No. 2011/0239578 ("the '578 application), commonly owned with the present application and hereby incorporated herein in its entirety.

Figure 7:
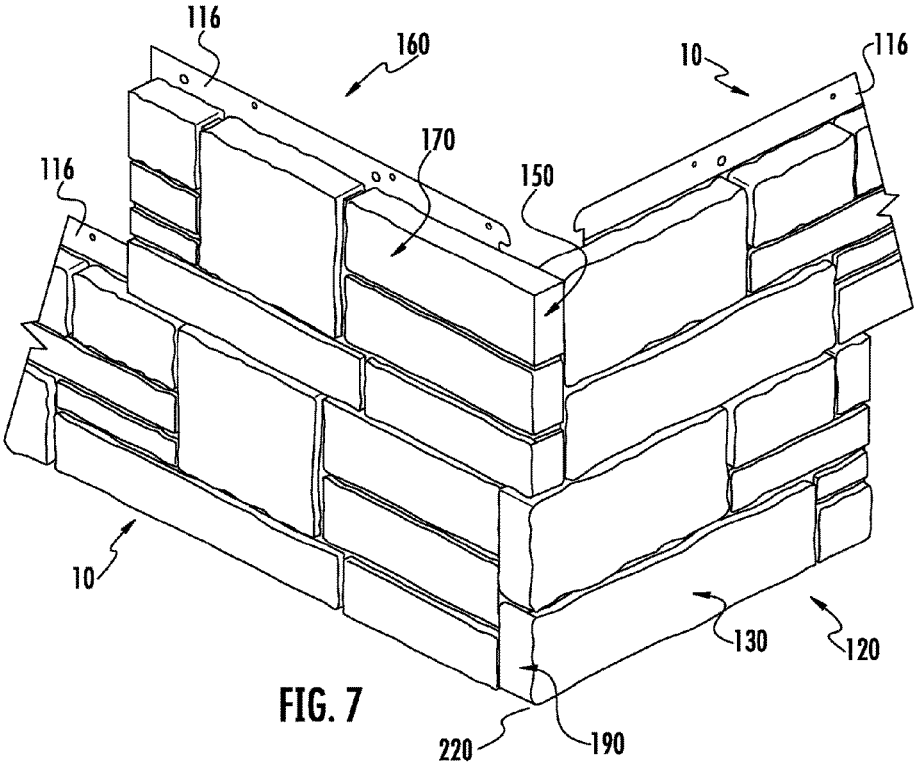
FIG. 7 is a perspective view of the first portion 120 and the second portion 130 of the universal corner panel 100 of FIG. 2, as positioned relative to two standard flat panels 10 of FIG. 1, so as to form an exemplary outside corner 220 according to various embodiments.
Figure 8:
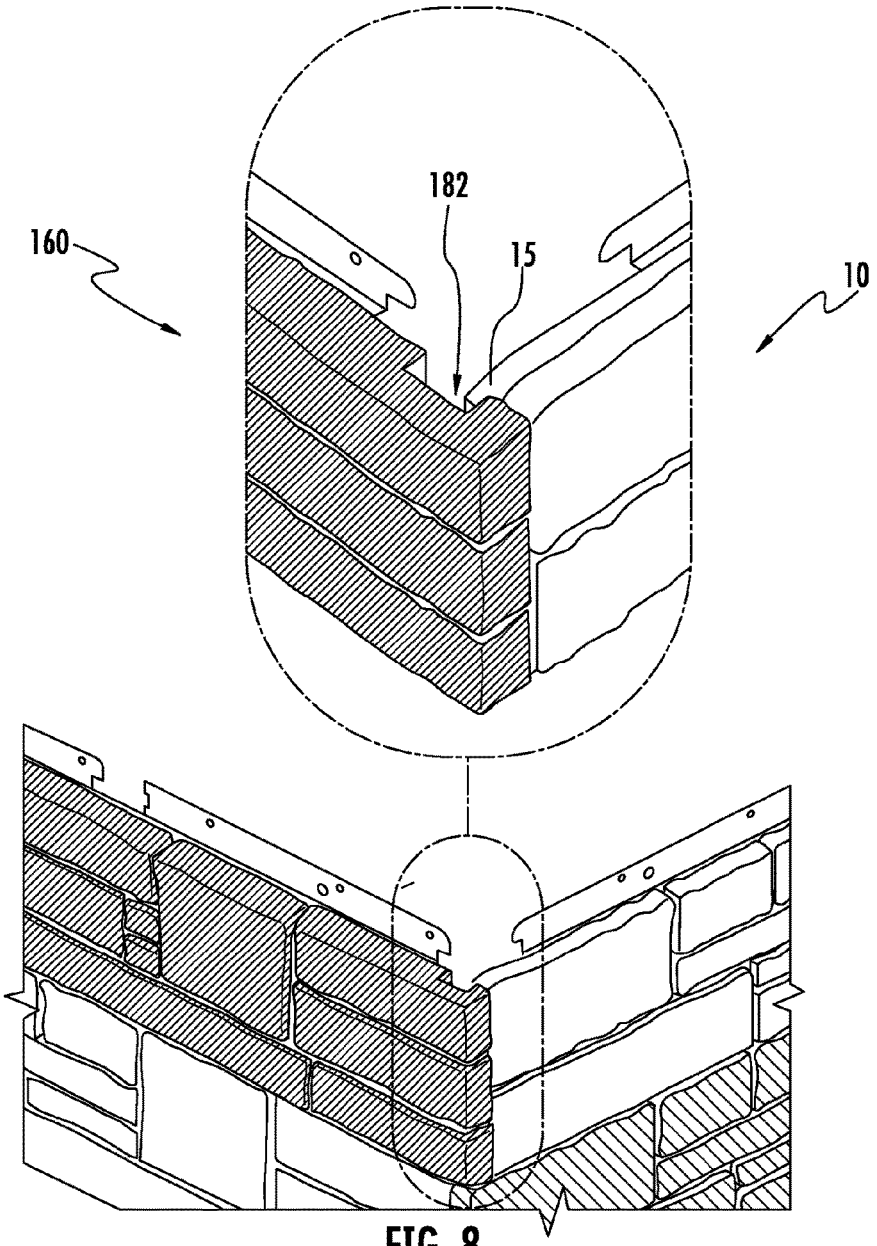
FIG. 8 is an exploded perspective view of the second portion 130 of the universal corner panel 100 and one of the standard flat panels 10 of FIG. 7, further illustrating the positioning of a tongue 50 of the standard flat panel within a channel 150 of the universal corner panel according to various embodiments.
Figure 10:
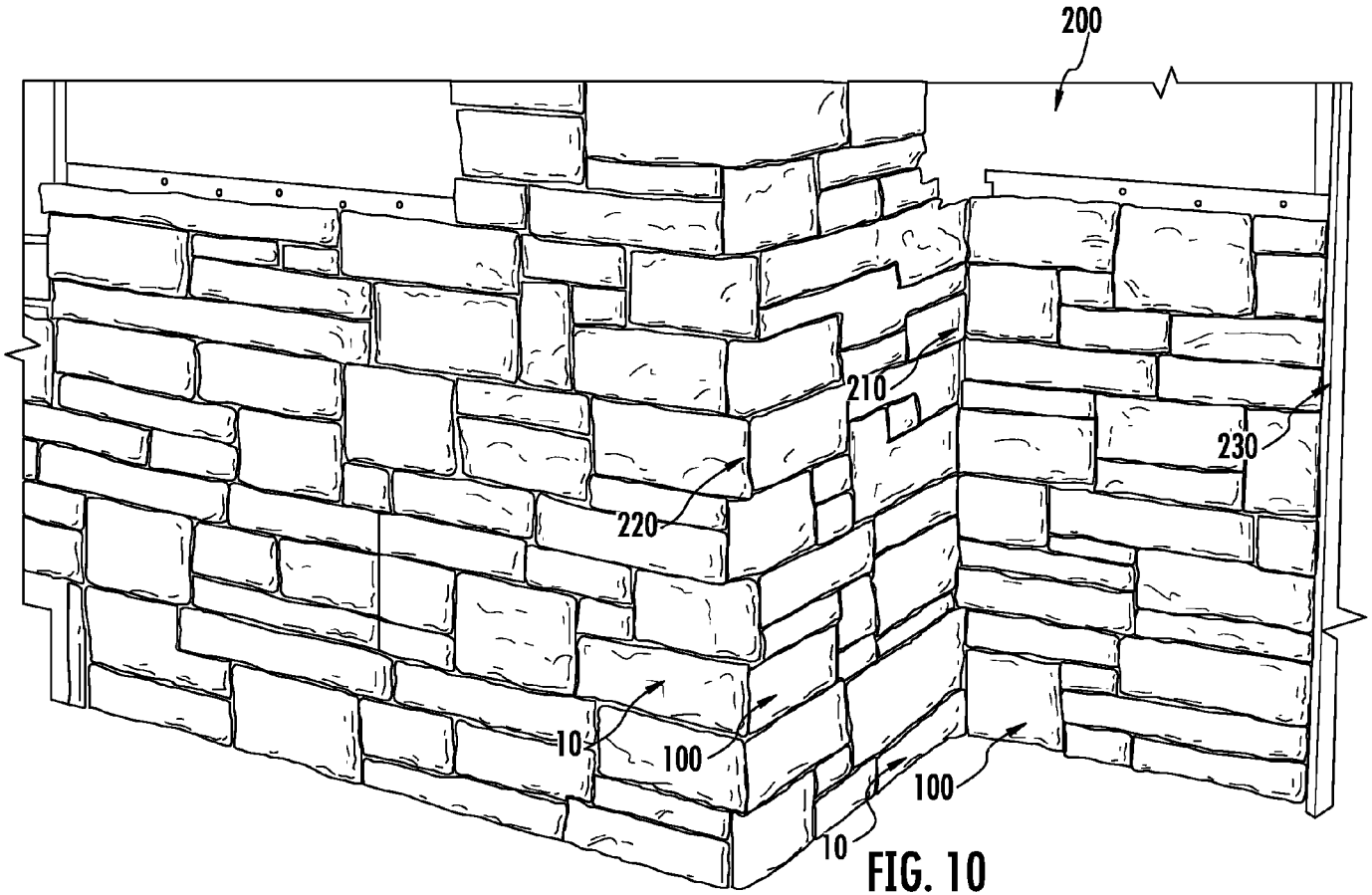
FIG. 10 is a perspective view of a plurality of standard flat panels 10 and universal corner panels 100 according to various embodiments, being used to form still further exemplary inside corners 210, outside corners 220, and end wall terminations 230.
Figure 11A:
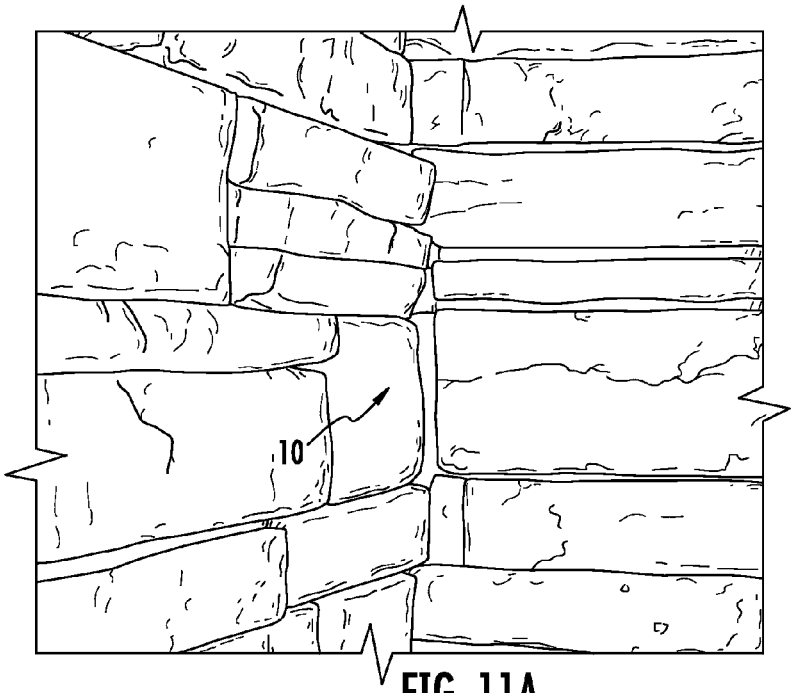
FIG. 11A is a perspective view of an installation of the standard flat panel 10 in an exemplary inside corner 210 configuration.
Figure 11B:
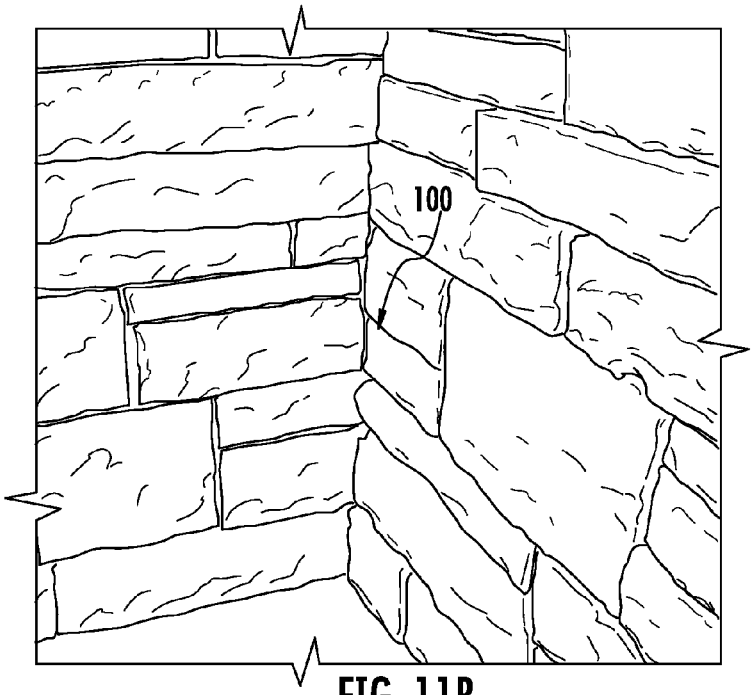
FIG. 11B is a perspective view of an installation of the universal corner panel 100 in an inside corner 210 substantially analogous to that of FIG. 11A.

For installation as an outside-oriented corner 220, as illustrated in at least FIGS. 7 and 10, as an initial step, the installer may start at a bottom of a wall and position either a first cut segment 120 or a second cut segment 160 into the trim strip with its mounting flange 116 oriented upward. A standard panel 10 may then be placed into the same trip strip on the adjacently oriented wall. The installer should, according to various embodiments, slide the universal corner panel 100 such that it extends slightly beyond the wall edge, such that the tongue 15 of the standard panel interfaces with the channel 142, 182 of the corner panel. The outside-oriented corner 220 appearance may then be fine-tuned with slight adjustments of both panels 10, 100 relative to one another until the best fit is achieved.

As may be seen with continued reference to at least FIG. 7, the universal corner panel 100 should be used in an alternating fashion on respective courses of a panel installation. As a non-limiting example, following the installation of either a first or second cut segment 120, 160, if a first cut segment 120 was installed in the first course (e.g., adjacent the trim strip), a second cut segment 160 should be installed in the second course, but on the opposing side of the outside-oriented corner 220. In other words, for installation of a second (or subsequent) course of panels about an outside-oriented corner 220, the installer would first position (continuing with our non-limiting example) the second cut segment 160 atop the standard panel 10 previously installed in the first course. The installer would then position another standard panel 10 in the second course, immediately atop the first cut segment 120 positioned in the first course. The second cut segment 160 and the second standard panel 10 would be interfaced by receiving the tongue 15 of the panel 10 into the channel 182 of the corner panel 100 (see also FIG. 8, close-up view of this interlocking feature).

Figure 4:
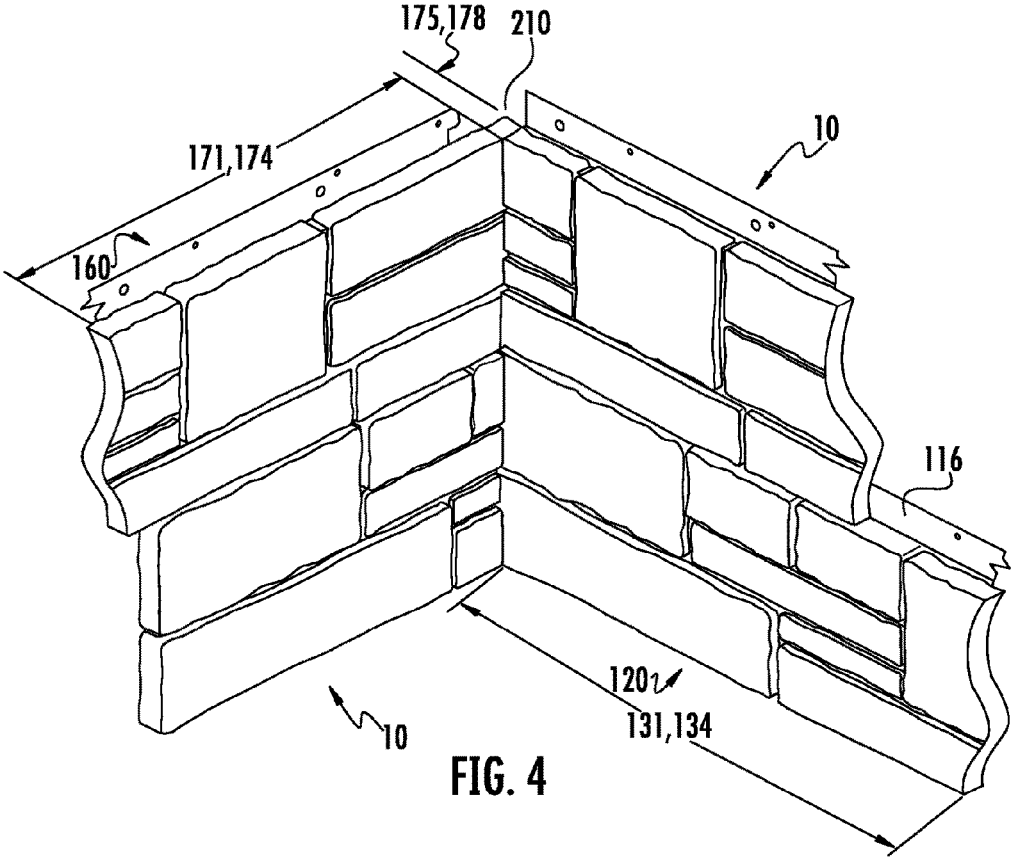
FIG. 4 is a perspective view of the first portion 120 and the second portion 130 of the universal corner panel 100 of FIG. 2, as positioned relative to two standard flat panels 10 of FIG. 1, so as to form an exemplary inside corner 210 according to various embodiments.
Figure 5:
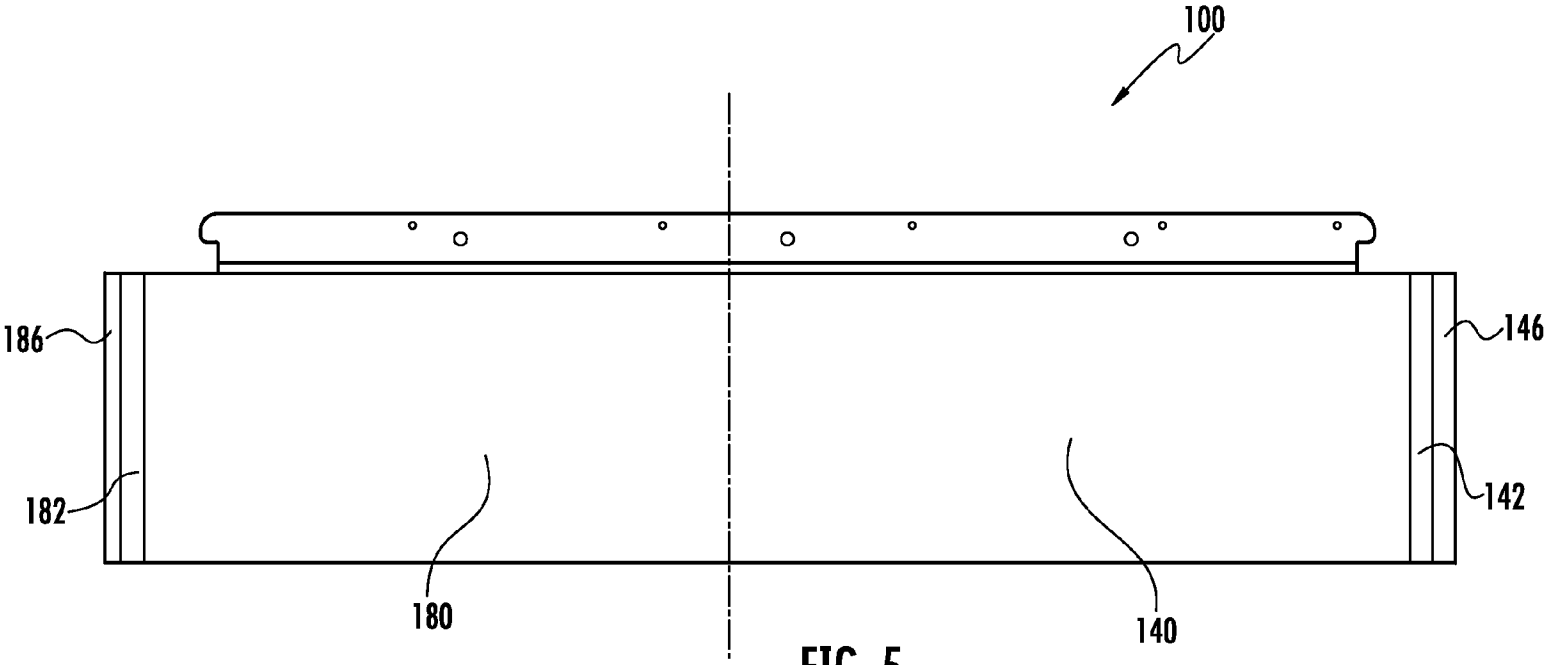
FIG. 5 is rear elevation view of the universal corner panel 100 of FIG. 2 according to various embodiments.

For installation as an inside-oriented corner 210, as illustrated in at least FIGS. 4 and 10, the installer proceeds to form an "alternating" set of courses. However, instead of interfacing a tongue of a standard panel 10 with a channel on the corner panel 100, the "non-decorative" portion 135, 175 (also known and described as peripheral portions 110, 112 herein) are positioned such that a side edge of an adjacently positioned standard panel substantially abuts the first surface of those portions. Due to the desirable surface topography of these portions, installation of the corner panel 100 in an inside-oriented corner results in substantially minimal, if any, gaps, as previously encountered with installations of the prior art. Such is evident from at least FIGS. 11A and 11B, when considered relative to one another.

Returning to FIG. 4, the universal corner panel 100 should be used in an alternating fashion on respective courses of an inside-oriented corner panel installation. As a non-limiting example, following the installation of a first cut segment 120 in a first course (e.g., adjacent the trim strip), a second cut segment 160 should be installed in a second course, but on the opposing side of the inside-oriented corner 210. In other words, for installation of a second (or subsequent) course of panels about an inside-oriented corner 210, the installer would first position (continuing with our non-limiting example) the second cut segment 160 atop the standard panel 10 previously installed in the first course. The installer would then position another standard panel 10 in the second course, immediately atop the first cut segment 120 positioned in the first course. The second cut segment 160 and the second standard panel 10 would be interfaced by abutting an end portion of the standard panel 10 substantially adjacent the "non-decorative" portions of the corner panel 100. It should be understood, of course, that in certain embodiments, such will require an installer, prior to positioning to remove the tongue 15 of the standard panel adjacent the abutting side edge, whether via passive removing or a more forcible removal thereof.

Figure 9:
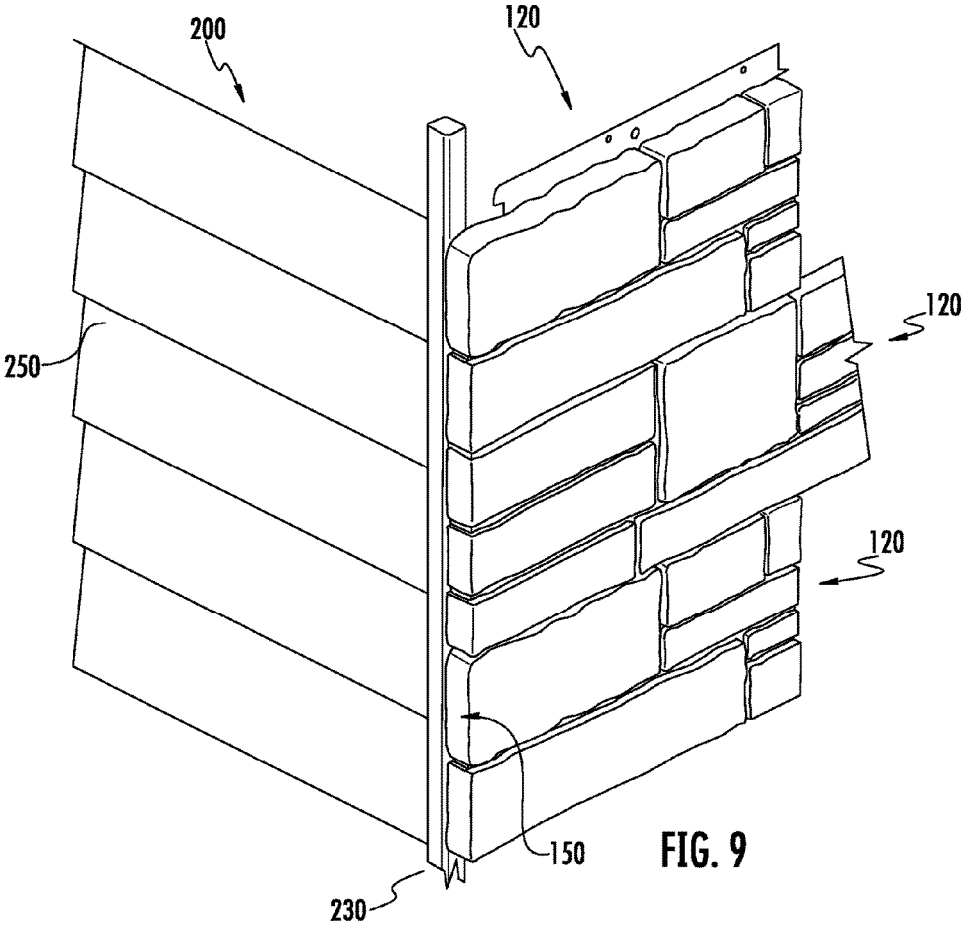
FIG. 9 is a perspective view of a plurality of first portions 120 of the universal corner panel 100 of FIG. 2, as positioned relative to a wall having an alternative cladding material 250, so as to form an exemplary end wall termination 230 according to various embodiments.

Turning now to FIG. 9, with reference also to FIG. 10, it should be understood that the universal corner panel 100 according to various embodiments may further be configured for use in terminating a wall installation without turning an encountered corner, whether inside or outside-oriented in nature. In FIG. 9, in the context of the non-limiting example of an outside-oriented corner, it may be seen that a plurality of first cut segments 120 are stacked sequentially atop one another, such that their respective side edges 150 form an aesthetically pleasing decorative "end wall" (versus a flat, nondescript edge as would be achieved with the standard panel 10 of at least FIG. 1). It should be understood that while an end wall termination such as that in FIG. 9 utilizes only first cut segments 120, an opposing directional termination, such as that illustrated in FIG. 10, would use only second cut segments 160.

It should be understood that while installation of the universal corner panel 100 has been described herein with reference to certain non-limiting examples of outside-oriented corners, inside-oriented corners, and end wall terminations, the panel may be used and/or installed in any of a variety of manners and in any of a variety of contexts, all as may be desirable for particular applications and practical for use with the structural and surface topography of the various portions of the panel 100.

The foregoing description of the various embodiments of the present invention has been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiments do not and are not intended to limit the ordinary meaning of the claims in their fair and broad interpretation in any way.

What is claimed is:

1. A panel, the panel comprising:

a first surface having a central portion and at least two peripheral portions adjacent opposite sides of the central portion;

a second surface that is opposite and in a plane substantially parallel to the first surface, the first and second surfaces defining two opposing and spaced apart side edges of the panel;

the central portion having a first surface topography defined by a first plurality of design elements, the first surface topography defining a first change in thickness among the design elements of the central portion, the first change in thickness being a difference between a maximum thickness of a thickest one of the design elements of the central portion and a minimum thickness of a thinnest one of the design elements of the design elements of the central portion, wherein the thickness is measured from the first surface of the panel to a distal surface of each design element along an axis that is substantially perpendicular to the first and second surfaces; and each of the two peripheral portions having a second and third surface topography, respectively, wherein the second surface topography is defined by a second plurality of design elements and the third surface topography is defined by a third plurality of design elements, the second and third surface topographies being substantially similar, the second surface topography defining a second change in thickness among the design elements of the second plurality of design elements, the second change in thickness being a difference between a maximum thickness of a thickest one of the second plurality of design elements and a minimum thickness of a thinnest one of the second plurality of design elements, and the third surface topography defining a third change in thickness among the design elements of the third plurality of design elements, the third change in thickness being a difference between a maximum thickness of a thickest one of the third plurality of design elements and a minimum thickness of a thinnest one of the third plurality of design elements, wherein the first surface topography is substantially different from the second and third surface topographies and the first change in thickness is substantially greater than the second change in thickness, and wherein the design elements extend outwardly from the first surface.

2. The panel of claim 1, further comprising:

at least two elongate channels defined in respective portions of the second surface opposing the second and third plurality of design elements of the first surface, wherein:

each of the elongate channels extends substantially adjacent and parallel to a respective one of the two side edges of the panel.

3. A panel, the panel comprising:

a precast body comprising:

a first surface having a first portion[,] *and* a second portion[, and a third portion], a second surface that is opposite and in a plane substantially parallel to the first surface;

the first portion comprising a first plurality of design elements, at least one design element of the first plurality having a maximum thickness of the first plurality and at least one design element of the first plurality having a minimum thickness of the first plurality; *and* the second portion comprising a second plurality of design elements, at least one design element of the second plurality having a maximum thickness of the second plurality and at least one design element of the second plurality having a minimum thickness of the second plurality[; and the third portion comprising a third plurality of design elements, at least one design element of the third plurality having a maximum thickness of the third plurality and at least one design element of the third plurality having a minimum thickness of the third plurality,]

wherein:

the design elements extend outwardly from the first surface, the thicknesses are measured from the first surface to a distal surface of each design element along an axis that is substantially perpendicular to the first and second surfaces, and

*a first edge of* the first portion [is centrally disposed between the second portion and the third portion,] *abuts a first edge of the second portion* and a first difference between the maximum and the minimum thicknesses of the first portion is substantially greater than a second difference between the maximum and the minimum thicknesses of the second portion [and a third difference between the maximum and the minimum thicknesses of the third portion].

4. The panel of claim 3, further comprising a mounting element including a first end embedded in the precast body and a second end projecting from the precast body, wherein the mounting element has a length less than a total length of the precast body.

5. The panel of claim 3, wherein:

at least one design element is disposed on the first surface such that the at least one design element extends between the first and the second portions.

6. The panel of claim 3, further comprising:

the first and second surfaces defining at least one side edge of the panel; and an elongate channel defined in a portion of the second surface opposing the second portion of the first surface, wherein:

the elongate channel extends substantially adjacent and parallel to the at least one side edge of the panel.

7. The panel of claim 3, further comprising:

at least one side edge of the panel extending between the first surface and the second surface adjacent the second portion of the panel, wherein:

a first design element of the second portion has a lateral portion having a first length as measured from the side edge to a distal edge of the first design element along an axis that extends parallel to the first and the second surfaces and a second design element of the second portion has a lateral portion having a second length that extends from the side edge to a distal edge of the second design element along the axis that extends parallel to the first and the second surfaces, the first length is a maximum length of the lateral portions of the design elements of the second portion and the second length is a minimum length of the lateral portions of the design elements of the second portion, and a third difference between the first and the second lengths of the lateral portions of the design elements extending from the side edge is substantially greater than the second difference in thickness.

8. The panel of claim 1, further comprising a mounting element extending outwardly from an upper surface of the central portion of the panel, the upper surface extending between the first surface and the second surface within a plane that is substantially perpendicular to the first and second surfaces, wherein the mounting element has a length less than a total length of the central and the at least two peripheral portions.

9. The panel of claim 1, wherein at least one design element is disposed on the first surface such that the at least one design element extends between the central portion and one of the at least two peripheral portions.

10. The panel of claim 9, wherein a thickness of the at least one design element tapers from the central portion to the peripheral portion.

11. The panel of claim 5, wherein a thickness of the at least one design element tapers from the first portion to the second portion.

*12. The panel of claim 3, wherein the first surface further comprises a third portion, the third portion comprising a third plurality of design elements, at least one design element of the third plurality having a maximum thickness of the third plurality and at least one design element of the third plurality having a minimum thickness of the third plurality, wherein the first portion is disposed centrally between the second portion and the third portion, and the first difference between the maximum and the minimum thicknesses of the first portion is substantially greater than a third difference between the maximum and the minimum thicknesses of the third portion.*

* * * * *